United States Patent [19]
Braswell-Moore

[11] Patent Number: 5,461,727
[45] Date of Patent: Oct. 31, 1995

[54] BOUFFANT HEADPIECE

[76] Inventor: Glenda M. Braswell-Moore, 405 Maiden La., Chesapeake, Va. 23325

[21] Appl. No.: 223,765
[22] Filed: Apr. 6, 1994
[51] Int. Cl.$^6$ ................. A42B 1/24; G02C 3/00
[52] U.S. Cl. .............. 2/171; 2/10; 2/174; 2/209.13; 2/918
[58] Field of Search .............. 2/10, 209.13, 422, 2/171.04, 174; 351/155, 156; 607/139

[56] References Cited

U.S. PATENT DOCUMENTS

| | | | |
|---|---|---|---|
| 2,493,363 | 1/1950 | Sapp | 2/174 X |
| 4,387,471 | 6/1983 | Hsu et al. | 2/10 |
| 4,464,797 | 8/1984 | Glassman | 351/155 X |
| 5,067,174 | 11/1991 | Ritchey | 2/10 |
| 5,123,115 | 6/1992 | Braswell-Moore | 2/10 |

FOREIGN PATENT DOCUMENTS 763721  12/1956  United Kingdom ......... 2/174

Primary Examiner—C. D. Crowder
Assistant Examiner—Shirra L. Jenkins
Attorney, Agent, or Firm—Griffin, Butler Whisenhunt & Kurtossy

[57] ABSTRACT

A bouffant headpiece (10) includes a loose bouffant-type cap (12) having an elastic strand (16) attached to, and extending about, a lower edge (17) thereof for contracting the lower edge of the cap onto a wearer's head. The headpiece also includes a head-band strap (50) having two free ends (52, 54) attached to the lower edge of the cap but only at a front portion (18) thereof for being wrapped about the wearer's head, when the cap is on the wearer's head, and being fastened together behind wearer's head to stabilize the position of the lower edge of the front portion of the loose cap. An elongated, flexible, eyeglass retainer member (14) having a proximal end portion (30) attached to the front portion of the cap and a distal end portion (32) for extending below the cap is for passing about a bridge of eyeglasses, doubling back on itself, and fastening to itself.

5 Claims, 2 Drawing Sheets

BOUFFANT HEADPIECE

BACKGROUND OF THE INVENTION

This invention relates generally to bouffant type caps used by technicians, specifically medical personnel, including nurses. Even more particularly, this invention relates to apparatus for retaining eyeglasses or safety glasses in place on technicians during procedures performed by the technicians.

U.S. Pat. No. 5,123,115 to Braswell-Moore describes a surgeon's headpiece having an elongated, flexible eyeglass retainer member attached to a front portion of a cap of the headpiece for extending below the cap, passing about a bridge of eyeglasses, and doubling back on itself to fasten on itself. In a depicted embodiment of that patent, the eyeglass retainer member is fastened to the cap in such a manner that a proximal end portion thereof, which is attached to the interior of a front portion of the cap, is exposed at the exterior of the cap by a slit in the cap. Although it is pointed out in U.S. Pat. No. 5,123,115 that the word "surgeon" includes not only surgeons but their assistants as well, it has been determined that the particular structure described therein is difficult for nurses, who normally wear bouffant type headpieces, to use. That is, nurse headpieces normally are larger and looser than doctor headpieces so as to accommodate larger hairdos. Further, such caps include elastic strands at lower edges thereof to compress the lower edges on heads of the wearers in order to prevent hair or other contaminants from escaping from the bouffant headpieces. These headpieces are also retained on wearers by these elastic strands. However, when an eyeglass retainer member of the type described in U.S. Pat. No. 5,123,115 is mounted on such a bouffant headpiece, it does not get sufficient vertical support from the elastic strand for adequately retaining eyeglasses on the nose of a wearer.

Thus, it is an object of this invention to provide a bouffant headpiece for use by medical personnel and other technicians which provides sufficient support for an elongated, flexible, eyeglass retainer member as well as for eyeglasses attached thereto.

Further, it is an object of this invention to provide a bouffant-type headpiece for medical personnel and other technicians whose front portion is fixedly held at a forehead of a wearer, above the wearer's nose, either with or without an eyeglass retainer member. Similarly, it is an object of this invention to provide such a headpiece which is loose for accommodating hairdos and yet which provides compression of a lower edge thereof for retaining loose hair and other contaminants therein.

It is a further object of this invention to provide such a bouffant headpiece which is not difficult to make, can be sold relatively inexpensively, and which looks good.

SUMMARY OF THE INVENTION

According to principles of this invention, a technician's bouffant headpiece, in addition to including an elastic strand about a lower edge of a loose cap thereof, also includes a headband strap having two free ends attached to the lower edge, but only at a front portion thereof, for being wrapped about the technician's head and fastened together to stabilize the position of the lower edge of the front portion of the loose cap. An elongated, flexible, eyeglass retainer member is attached to the front portion of the loose cap. In one embodiment the eyeglass retainer member is attached at a slit in the loose cap but with the headband strap extending across the slit, while in another embodiment the headband strap is also gaped at the slit, being attached to opposite side edges of the eyeglass retainer member.

BRIEF DESCRIPTION OF THE DRAWINGS

The invention is described and explained in more detail below using the embodiments shown in the drawings. The described and drawn features, in other embodiments of the invention, can be used individually or in preferred combinations. The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DESCRIPTION OF PREFERRED EMBODIMENTS

A medical technician's headpiece 10 comprises a loose, bouffant-style cap 12 and an elongated, flexible, eyeglass retainer member 14.

Figure 1:
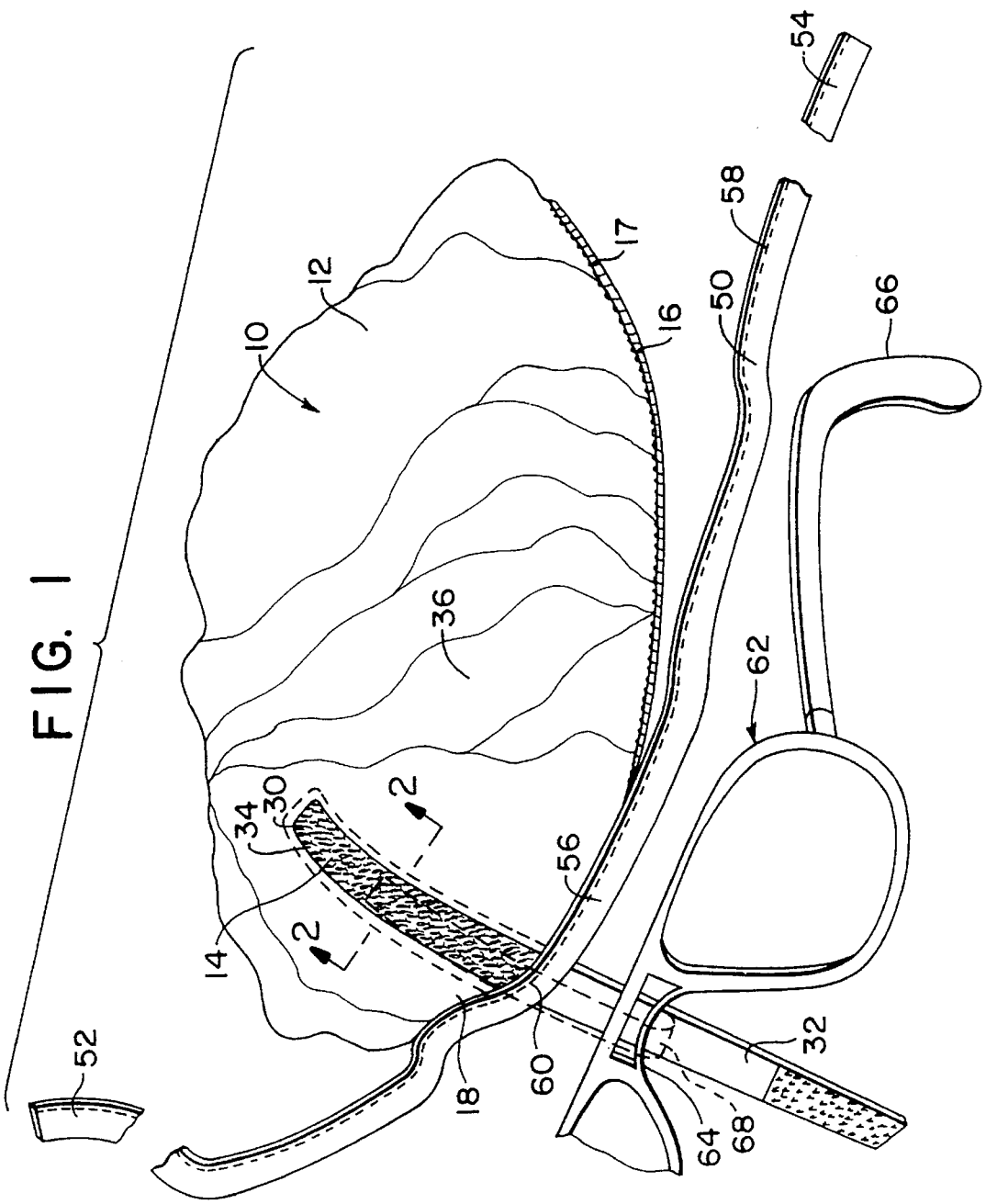
FIG. 1 is an isometric view of a technician's bouffant headpiece including an eyeglass retainer member along with a pair of eyeglasses, the eyeglass retainer member being shown fastened about a nose bridge of the eyeglasses in phantom.

The cap 12 is normally of a tough tissue-like material which can be relatively easily torn, is quite absorbent, and is quite porus for allowing passage of air therethrough. The particular cap shown in FIG. 1 is a bouffant cap of a type normally worn by female medical personnel because the cap 12 is sufficiently large and flexible for accommodating variously-sized and irregularly-shaped hairdos. The headpiece 10 includes an elastic strand 16 at a lower edge 17 of the cap 12 thereof extending completely about or substantially completely about the lower edge 17. The elastic strand 16 compresses the lower edge 17 on the head of a user so as to retain loose hair and contaminants. The elastic strand 16 also supports the headpiece 10 to some extent on the head of the user but yet allows the user to easily change the position of the lower edge 17 on his or her head. In this regard, the elastic strand 16 does not hold the lower edge 17 at a particular location on a user's head against a substantial force and the bouffant cap 12 itself, since it is loose, also provides very little vertical support for the lower edge 17.

Figure 2:
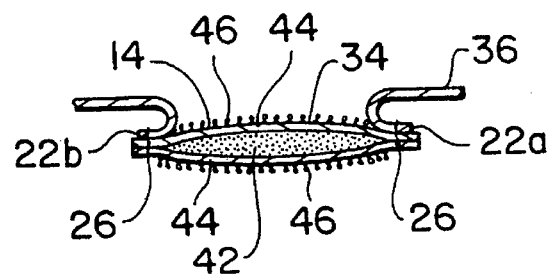
FIG. 2 is an segmented cross sectional view taken on line 2—2 in FIG. 1.
Figure 3:
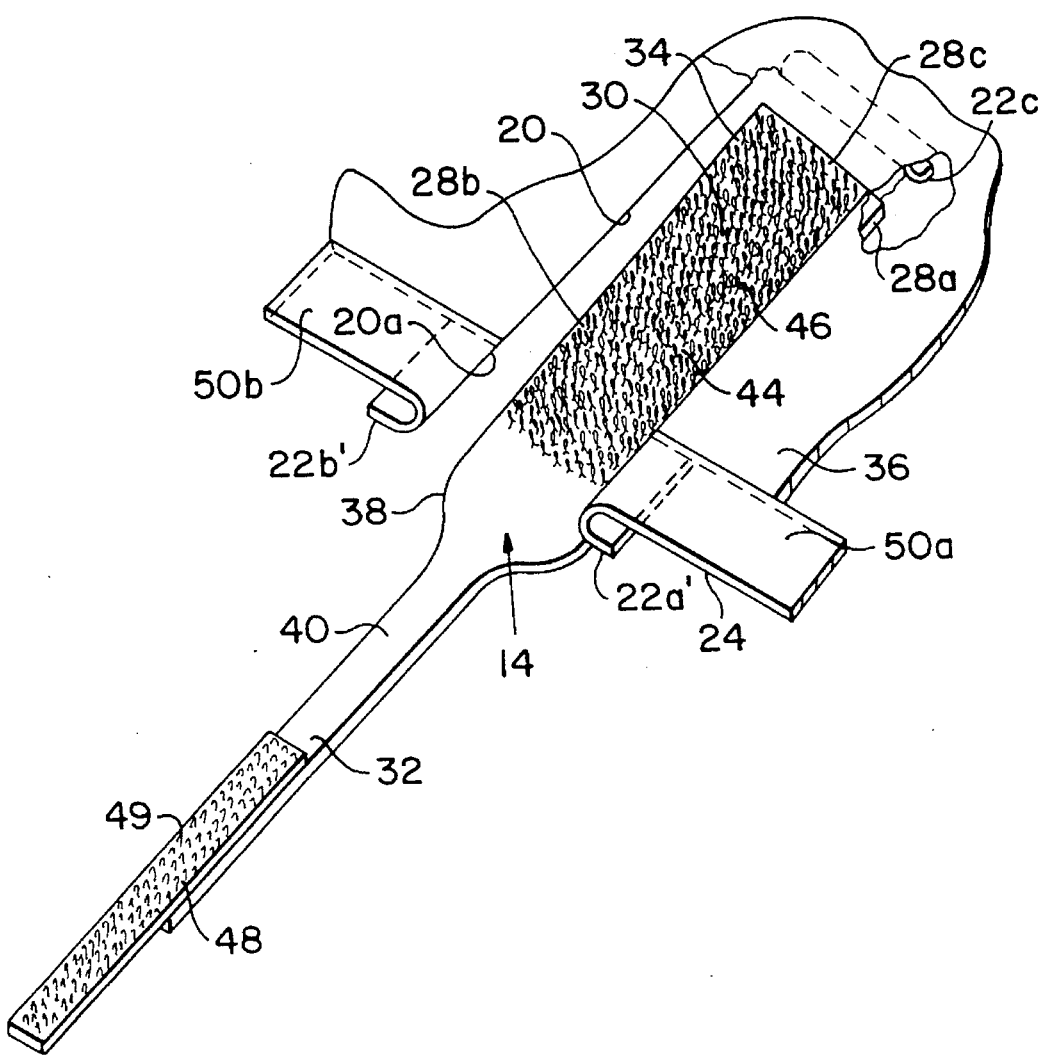
FIG. 3 is a segmented, cutaway, isometric, exploded, view of another embodiment of the technician's headpiece of FIG. 1.

The eyeglass retainer member 14 is sewn to a front portion 18 of the cap 12 as is depicted in FIG. 1. In this respect, the cap 12 is cut, or slit, at its front portion 18 to form a slit 20 (FIG. 3). Right, left and rear edges 22a, 22b, and 22c, defining the slit 20 are doubled back toward an interior surface 24 of the cap 12 and sewn by stitches 26 (FIG. 2) to right, left, and edge portions 28a, 28b, and 28c (FIG. 3) of a proximal end portion 30 of the eyeglass retainer member 14. In this regard, the proximal end portion 30, which is sewn into the interior surface of the cap 12 has a substantially greater width than a distal, or outer-end, portion 32 of the eyeglass retainer member which extends below the cap 12. It can be seen in all three Figs. that when the eyeglass retainer member 14 is sewn into the interior of the cap 12, in the manner described, most of a top surface 34 of the wider proximal end portion 30 is exposed from an exterior surface 36 of the cap 12, however, the right, left and end edge portions 28a, 28b and 28c of the proximal end portion 30 are not exposed and cannot be gripped from the exterior of the cap 12.

The proximal end portion 30 of the eyeglass retainer member 14 is about 1¼ inches wide and 2½ inches long while the distal end portion 32 is about ⅜ inches wide and about 4–6 inches long. The proximal and distal end portions 30 and 32 join one another at a Y-shaped tapered interface 38. In a preferred embodiment, a base member of the eyeglass retainer member 14 is constructed of a soft foam plastic core 42 having layers of soft loop-fastener material 44 with fastening loops 46 extending outwardly therefrom.

A 1⅜ inch piece of hook fastener material 48 is attached approximately at a distal end of the distal end portion 32 so that its hooks face in the same direction as the exterior surface 36 of the cap 12 when the retainer member is extended in a linear configuration. The soft material 44, with fastening loops 46, and the hooks fastener material 48, with hooks 49, can be of a type sold under the trademark VELCRO, however, other materials will work as well.

The headpiece 10 further includes a headband cloth strap 50 having two opposite free ends 52 and 54 and having a center portion 56 which is attached to the lower edge 17 but only at the front portion 18 at the cap 12 which is to be placed immediately over a nose of a wearer. In this regard, the attached center portion 56 of the headband strap 50 extends along a length of between 6 and 7 inches, with the elastic strand 16 being unexpanded, while the total circumference of the lower edge 17 is approximately 16 inches with the elastic strand 16 being unexpanded. In this regard, the elastic strand also extends along the connection between the lower edge 17 of the cap 12 and the headband strap 50 in one embodiment; however, this is not necessary since the headband strap 50, which is not elastic nor substantially stretchable, will be pulled taut in any case once the headpiece 10 is worn.

In the FIG. 1 embodiment, the headband strap 50 is of one continuous cloth strip, formed of one member having two plies folded on themselves and stitched along a stitch-line 58, extending from free end 52 to free end 54. Thus, in the FIG. 1 embodiment, the headband strap 50 extends across the slit 20. Thus, the non-expandable headband strap 50 extends over the eyeglass retainer member 14, but is also stitched thereto along a stitch-line 60.

In the embodiment depicted in FIG. 3, the headband strap 50a, 50b is divided into two pieces to be gaped at the slit 20. Thus, the slit 20 is extended by a gap 20a between end portions of the headband strap 50a, 50b. In this case, ends 22a' and 22b' of the headband strap 50a, 50b are also attached to opposite side edges of the proximal end portion 30 of the eyeglass retainer member 14. Thus, in the FIG. 3 embodiment, the headband strap 50 is actually formed of two pieces which are interconnected by the eyeglass retainer member 14.

The headband strap is approximately ½–¾ inches wide, and 36 inches long. As described above it is sewn to the interior lower edge of the front portion of the cap 12, that is, the portion of the cap extending only across a forehead, from temple to temple.

In operation, a technician puts on the headpiece 12 of either embodiment by expanding the elastic strand 16 and the lower edge of the cap 12 and placing it about his or her head. Once the cap is thusly applied, the free ends 52 and 54 of the headband strap 50 hang freely on each side of the wearer's face. These free ends are pulled by the wearer above and behind the wearer's ears and are tied, or otherwise attached snugly, comfortably, to one another, under the wearer's hairline. Each side and the back of the lower edge of the bouffant cap 12 can then be pulled over the wearer's ears or otherwise adjusted as the wearer desires without moving the position of the headband strap 50. Eyeglasses 62 are then placed on the wearer with a nose bridge 64 thereof being supported by the wearer's nose and earpieces 66 being slid over the wearer's ears. Thus, the nose bridge 64 is placed on top of the distal end portion 32 of the eyeglass retainer member 14 which is hanging on the wearer's nose. The distal end portion 32 is then looped about the nose bridge 64 of the wearer's eyeglasses 62 and the wearer presses the hooks 49 of the hook fastener material 48 against the fastening loops 46 of the top surface 34 of the proximal end portion 30 so that these fastening hooks and loops fasten to one another. In this configuration, the distal end portion 32 forms a loop 68, as is depicted in phantom in FIG. 1, enclosing the nose bridge 64 of the eyeglasses 62. This loop securely holds the eyeglasses in position on the technician's nose, not letting the nose bridge 64 slide down the technician's nose. In this regard, the cap 12 and the elastic strand 16 at the lower edge 17 do not provide substantial support for the eyeglasses 62, but rather, the eyeglasses 62 are mainly supported by the headband strap 50 which fixes, or stabilizes, the front portion of the lower edge 17 in place above the nose of the wearer. That is, when the headband strap 50 is wrapped about the wearer's head, it is pulled taut so that the center portion 56 thereof is held fixed above the wearer's nose.

It will be appreciated by those of ordinary skill in the art that the front lower edge portion of a bouffant headband cap of this invention can be fixed in position on a wearer's forehead, either with or without the eyeglass retainer member 14. However, such a bouffant headband cap is particularly useful when combined with an eyeglass retainer member because the retainer member, and glasses supported thereby, require more vertical support than do front lower edge portions of bouffant caps without eyeglass retainer members.

Another benefit of this invention is that while it allows the wearer to fix the front lower edge portion of the cap in a fixed position, it also allows the wearer to adjust most other portions of the lower edge portion of the cap about the wearer's hair and ears without moving the front lower edge portion.

Yet another benefit of this invention is that the headband strap 50 can be made of an impervious material that would prevent splashed body fluids from penetrating skin or contaminating a forehead of a wearer. In this case the cap can still be mostly of tissue-like material for allowing air circulation.

Still another benefit of this invention is that the headband strap can be manufactured of an absorbent material to help absorb perspiration from a wearer.

Another benefit of this invention is that a compressing pressure of a thin elastic strand at the front lower edge of the cap is spread out by the headband strap so that less hair breakage is caused at a front hairline of the wearer than for normal bouffant caps.

Finally, the headstrap of the bouffant headband cap of this invention gives the bouffant cap a much more attractive and fashionable appearance than normal bouffant caps have.

Although a particular cap is described herein it should be understood that there are many types of bouffant caps worn by technicians and that this invention is not limited to one type of loose bouffant cap.

While the invention has been particularly shown and described with reference to a preferred embodiment, it should be understood by those skilled in the art that various changes in form and detail may be made therein without departing from the spirit and scope of the invention.

The embodiments of the invention in which an exclusive property or privilege are claimed are defined follows:

1. A technician's headpiece for being placed on a technician's head for receiving the technician's head in an interior of a loose bouffant cap thereof with a front portion of said cap being approximately above the technician's nose, said headpiece further including:

an elastic compressing strand attached to, and extending about, a lower edge of the cap for contracting the lower edge of the cap onto the technician's head and thereby helping to hold the cap on the technician's head while also preventing the escape of hair and/or other contaminants from the technician's head;

an elongated, flexible, eyeglass retainer member having a proximal end portion attached to the front portion of the cap and a distal end portion for extending below the cap, passing about a bridge of eyeglasses, doubling back on itself and being fastened to itself at the front portion of said cap;

a headband strap having two free ends, said headband strap being attached to the lower edge of said cap, but only at the front portion thereof, for being wrapped about the technician's head and having its two ends fastened together to stabilize the position of the lower edge of the front portion of the cap, said strap being of such a size and shape, and being positioned so as not to substantially interfere with said distal end portion of said eyeglass retainer member being attached to said proximal end portion thereof at said front portion of said cap, whereby said eyeglass retainer member is supported by said headband strap.

2. A technician's headpiece as in claim 1 wherein the cap is slit at said front portion, said eyeglass retainer member being attached to the said cap at opposite edges defining said slit.

3. A techician's headpiece as in claim 2 wherein said headband strap comprises one piece which extends across the slit.

4. A technician's headpiece as in claim 2 wherein the headband strap comprises two pieces which are interconnected by the eyeglass retainer member at the slit.

5. A technician's headpiece as in claim 1 wherein said headband strap comprises one piece which extends across and on top of the eyeglass retainer member at said lower edge.

* * * * *